US007493206B2

(12) United States Patent
Lahti et al.

(10) Patent No.: US 7,493,206 B2
(45) Date of Patent: Feb. 17, 2009

(54) METHOD AND APPARATUS TO DETERMINE INSTANTANEOUS ENGINE POWER LOSS FOR A POWERTRAIN SYSTEM

(75) Inventors: John L. Lahti, Novi, MI (US); Anthony H. Heap, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 118 days.

(21) Appl. No.: 11/737,197

(22) Filed: Apr. 19, 2007

(65) Prior Publication Data

US 2008/0262698 A1 Oct. 23, 2008

(51) Int. Cl.
*G06F 19/00* (2006.01)
*F02D 41/04* (2006.01)

(52) U.S. Cl. .......................... 701/103; 701/54; 701/115

(58) Field of Classification Search .................. 701/54, 701/101–105, 114, 115; 123/350, 352; 702/182, 702/183

See application file for complete search history.

(56) References Cited

U.S. PATENT DOCUMENTS 4,719,025 A * 1/1988 Akiyama et al. ............ 508/499
6,416,437 B2 * 7/2002 Jung ............................ 475/8
6,959,241 B2 * 10/2005 Itow et al. .................. 701/102

* cited by examiner

*Primary Examiner*—Willis R. Wolfe, Jr.
*Assistant Examiner*—Johnny H. Hoang

(57) ABSTRACT

There is provided a method and an article of manufacture comprising a storage medium having machine-executable code stored therein for estimating a power loss for an internal combustion engine at a point in time. The code includes code to determine engine operating conditions. A nominal power loss is determined based upon an engine operating point. A power loss correction to the nominal power loss is determined based upon barometric pressure, engine temperature, air/fuel ratio, and catalyst temperature. The power loss correction is determinable for: an engine air/fuel ratio mode, an engine cylinder activation mode, and, an engine operating temperature mode.

20 Claims, 5 Drawing Sheets

| $T_{CAT}$ Catalyst Temperature (°C) | t, Run Time (sec): 0 | 30 | 60 | 90 | 120 | 150 | ... |
|---|---|---|---|---|---|---|---|
| 0 | $\beta_1$=1. . . $\beta_8$= 0.5 | | | | | | |
| 125 | | | | | | | |
| 250 | | | | | | | |
| 375 | | | | | | | |
| 500 | | | | | | | |
| 625 | | | | | | | |
| 750 | | | | | | | |
| 875 | | | | | | | |
| 1000 | | | | | | | |

*FIG. 5*

METHOD AND APPARATUS TO DETERMINE INSTANTANEOUS ENGINE POWER LOSS FOR A POWERTRAIN SYSTEM

TECHNICAL FIELD

This invention pertains generally to control systems for powertrain systems.

BACKGROUND OF THE INVENTION

Powertrain control systems, including hybrid powertrain architectures, operate to meet operator demands for performance, e.g., torque and acceleration, which are balanced against other operator requirements and regulations, e.g., fuel economy and emissions. In order to optimize control of the powertrain, there is a need to quantify engine power losses associated with operating conditions during ongoing operation.

Prior art systems to determine instantaneous engine power losses have relied upon pre-calibrated tables stored in an on-board computer to determine losses. These systems consume substantial amounts of computer memory and are often unable to accommodate variations in operating conditions. The memory space is further compounded when other engine operating modes, e.g., cylinder deactivation, are introduced.

There is a need for a system to rapidly and effectively determine engine power losses for engine operating conditions and operational control during ongoing engine operation. Such a system is now described.

SUMMARY OF THE INVENTION

In accordance with an embodiment of the invention, an article of manufacture is provided comprising a storage medium having machine-executable code stored therein for estimating a power loss for an internal combustion engine. The code includes code to monitor engine operating conditions. A nominal power loss is determined based upon an engine operating point, typically comprising engine speed and load. A power loss correction to the nominal power loss is determined based upon barometric pressure, engine temperature, air/fuel ratio, and catalyst temperature. The power loss correction determinable for: an engine air/fuel ratio mode, an engine cylinder activation state, and, an engine operating temperature mode.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, an embodiment of which is described in detail and illustrated in the accompanying drawings which form a part hereof, and wherein.

DETAILED DESCRIPTION OF AN EMBODIMENT OF THE INVENTION

The invention comprises a control scheme, executed as machine-executable code in one or more control modules, for estimating a power loss for an internal combustion engine during ongoing operation. The control scheme calculates fuel power loss at a point in time during ongoing engine operation. The control scheme executes one of a plurality of polynomial equations to calculate the fuel power losses related to emissions and fuel economy rapidly, allowing execution of multiple calculations during a short time period. An engine control scheme uses the estimated power loss to control operation of the engine to achieve one or more specific performance criteria, e.g., engine warm-up, emissions, and fuel economy.

Figure 1:
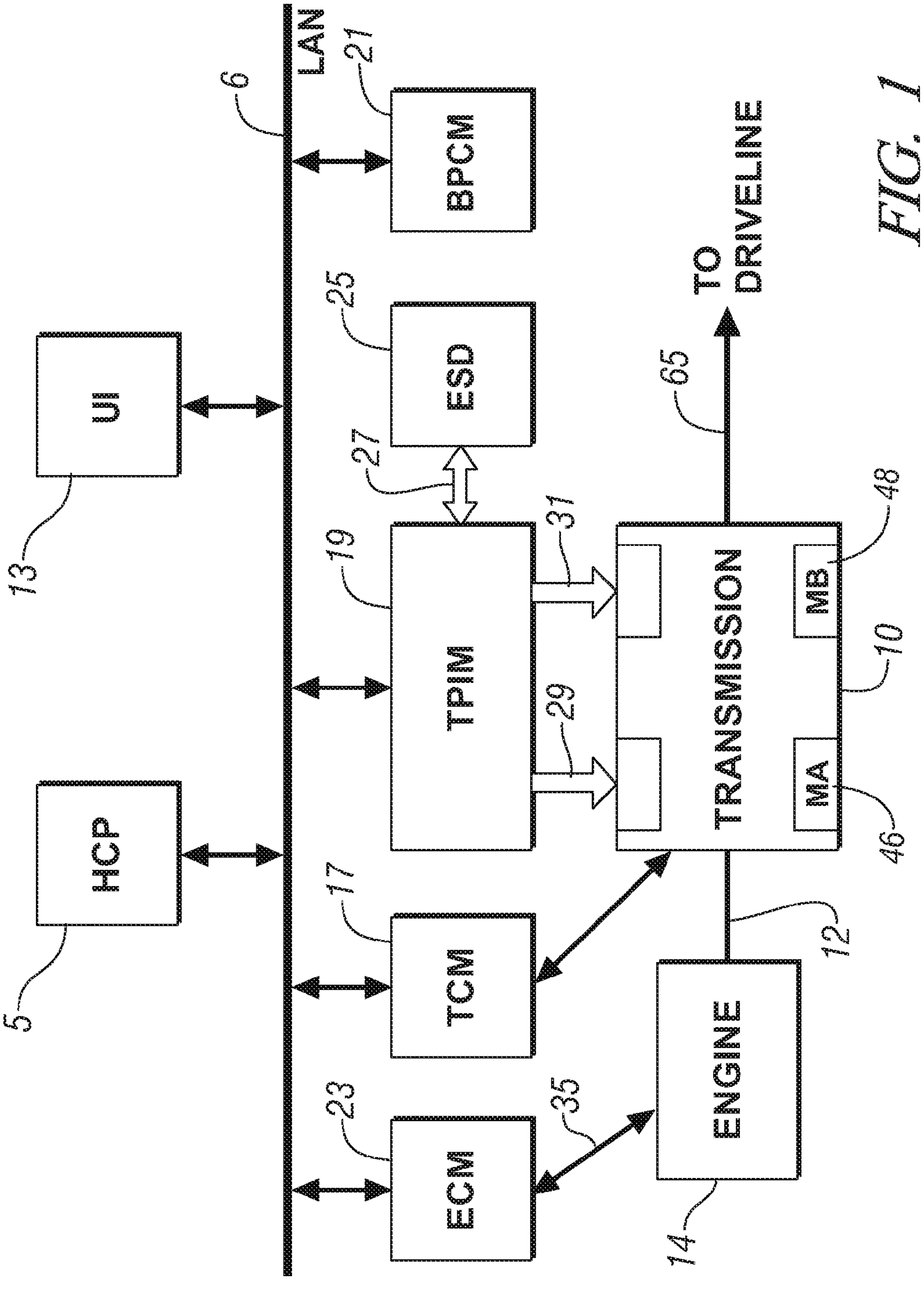
FIG. 1 is a schematic diagram of an exemplary architecture for a powertrain and a control system, in accordance with the present invention.

Referring now to the drawings, wherein the showings are for the purpose of illustrating the invention only and not for the purpose of limiting the same, FIG. 1 depicts a schematic diagram of a powertrain and control system illustrative of the invention. The elements described hereinafter provide coordinated control of the powertrain system. The powertrain comprises an internal combustion engine 14 and an electromechanical transmission 10 operative to provide a torque output to a driveline via an output shaft 65. The electromechanical transmission 10 includes a pair of electrical machines MA, MB 46, 48. The engine, transmission, and electrical machines are operative to transmit torque therebetween according predetermined control schemes and parameters not discussed in detail herein.

The exemplary internal combustion engine 14 comprises a multi-cylinder internal combustion engine selectively operative to transmit torque to the transmission via shaft 12, and can be either a spark-ignition or a compression-ignition engine. The engine is selectively operative in a plurality of operating modes and engine states. The engine operating modes include an air/fuel ratio control mode comprising one of a stoichiometric operating mode and a rich operating mode. On a system employing a compression-ignition engine, there may be an additional or alternative mode comprising a lean operating mode. The engine operating modes include an engine temperature management mode comprising a warm-up mode and a warmed-up mode, typically based upon engine coolant temperature. The warm-up mode typically includes retarding spark timing (or fuel injection timing) during initial engine operation to increase heat transfer to the engine during combustion. Exemplary engine states comprise normal engine control ('ALL_CYL'), and engine control with deactivated cylinders ('DEACT'). In normal engine state, all the engine cylinders are fueled and fired. In cylinder deactivation state, typically half of the cylinders, e.g., one bank of a V-configured engine, are deactivated. A bank of cylinders is typically deactivated by discontinuing fuel injection thereto.

The exemplary engine includes an exhaust aftertreatment system (not shown) operative to oxidize and/or reduce engine exhaust gas feedstream constituents to harmless gases. Operating temperature(s) of the exhaust aftertreatment system are critical, as temperatures that are too low can result in inefficient conversion of regulated exhaust gas constituents, e.g., hydrocarbons (HC), carbon monoxide (CO), nitrides of oxygen ($NO_X$), and particulate matter (PM). Excessive temperatures can damage aftertreatment components, especially a catalyst. Engine control and operating schemes include causing non-optimal engine control to control exhaust gas feedstream temperatures and constituents, to either increase or decrease temperature of the aftertreatment system. This includes operating schemes to effectively light-off the aftertreatment system, i.e., induce exothermic reactions therein. Therefore, there can be power losses or inefficiencies associated with engine emissions.

In the embodiment depicted, the transmission 10 receives input torque from the torque-generative devices, including the engine 14 and the electrical machines MA, MB 46, 48 as a result of energy conversion from fuel or electrical potential stored in an electrical energy storage device (ESD) 25. The electrical machines MA, MB 46, 48 preferably comprise three-phase AC electrical machines, each having a rotor rotatable within a stator. The ESD 25 is high voltage DC-coupled to a transmission power inverter module (TPIM) 19 via DC transfer conductors 27. The TPIM 19 is an element of the control system. The TPIM 19 transmits electrical energy to and from MA 46 by transfer conductors 29, and the TPIM 19 similarly transmits electrical energy to and from MB 48 by transfer conductors 31. Electrical current is transmitted to and from the ESD 25 in accordance with whether the ESD 25 is being charged or discharged. TPIM 19 includes the pair of power inverters and respective motor control modules configured to receive motor control commands and control inverter states therefrom for providing motor drive or regeneration functionality.

The control system synthesizes pertinent information and inputs, and executes algorithms to control various actuators to achieve control targets, including such parameters as fuel economy, emissions, performance, driveability, and protection of hardware, including batteries of ESD 25 and MA, MB 46, 48. The exemplary embodiment, there is a distributed control module architecture including an engine control module ('ECM') 23, a transmission control module ('TCM') 17, battery pack control module ('BPCM') 21, and the TPIM 19. A hybrid control module ('HCP') 5 provides overarching control and coordination of the aforementioned control modules. There is a User Interface ('UI') 13 operably connected to a plurality of devices through which a vehicle operator typically controls or directs operation of the powertrain including the transmission 10 through a request for a torque output. Exemplary vehicle operator inputs to the UI 13 include an accelerator pedal, a brake pedal, transmission gear selector, and, vehicle speed cruise control. Each of the aforementioned control modules communicates with other control modules, sensors, and actuators via a local area network ('LAN') bus 6. The LAN bus 6 allows for structured communication of control parameters and commands between the various control modules. The specific communication protocol utilized is application-specific. The LAN bus and appropriate protocols provide for robust messaging and multi-control module interfacing between the aforementioned control modules, and other control modules providing functionality such as antilock brakes, traction control, and vehicle stability.

The HCP 5 provides overarching control of the hybrid powertrain system, serving to coordinate operation of the ECM 23, TCM 17, TPIM 19, and BPCM 21, based upon various input signals from the UI 13 and the powertrain, including the battery pack. The ECM 23 is operably connected to the engine 14, and functions to acquire data from a variety of sensors and control a variety of actuators, respectively, of the engine 14 over a plurality of discrete lines collectively shown as aggregate line 35. Sensing devices (not shown) operative to monitor engine operation typically comprise a crankshaft sensor, a manifold absolute pressure (MAP), and, a coolant temperature sensor, among others. The TCM 17 is operably connected to the transmission 10 and functions to acquire data from a variety of sensors and provide command signals to the transmission, including monitoring inputs from pressure switches and selectively actuating pressure control solenoids and shift solenoids to actuate various clutches to achieve various transmission operating modes. The BPCM 21 is signally connected one or more sensors operable to monitor electrical current or voltage parameters of the ESD 25 to provide information about the state of the batteries to the HCP 5. Such information includes battery state-of-charge ('SOC'), battery voltage and available battery power.

Each of the aforementioned control modules preferably comprises a general-purpose digital computer generally including a microprocessor or central processing unit, storage mediums comprising read only memory (ROM), random access memory (RAM), electrically programmable read only memory (EPROM), i.e., non-volatile memory, high speed clock, analog to digital (A/D) and digital to analog conversion (D/A) circuitry, and input/output circuitry and devices (I/O) and appropriate signal conditioning and buffer circuitry. Each control module has a set of control algorithms, comprising machine-executable code and calibrations resident in the ROM and executable to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25, 50 and 100 milliseconds (msec) during ongoing engine and vehicle operation. Alternatively, algorithms may be executed in response to occurrence of an event.

Machine-executable code is stored in a memory device of one of the control modules operative to estimate a power loss for the exemplary internal combustion engine at a point in time, i.e., instantaneously. This includes monitoring and determining engine operating conditions. A nominal power loss is determined for an engine operating point, i.e., engine speed and load, or torque output. A power loss correction is calculated and used to adjust the nominal power loss.

Determining engine operating conditions comprises monitoring inputs from various engine sensing devices and engine operation time to determine engine speed (RPM), engine load (Brake Torque, Nm), barometric pressure, and, engine coolant temperature. Engine air/fuel ratio is typically a commanded parameter and can be measured directly or estimated based upon engine operating conditions. Temperature of the exhaust aftertreatment system (e.g., a catalyst) can be estimated based upon the operating conditions.

The nominal power loss is determined based upon the engine operating point, comprising input speed (Ni) and input torque (Ti) originating from the engine and load. The nominal power loss is preferably determined during each 50 msec engine loop cycle. The nominal power loss can be determined from a predetermined calibration table, determined for the exemplary engine operating over a range of engine speed and load conditions under nominal engine operating conditions for temperature, barometric pressure and stoichiometric air/fuel ratio (i.e., EQR=1.0). An exemplary calibration table is depicted graphically in FIG. 2, the substance of which is executed in ROM of one of the control modules.

Determining the nominal engine power loss and power loss correction comprises executing one of a plurality of embedded polynomial equations which calculates a power loss correction based upon the current actual operating conditions, i.e., barometric pressure, engine temperature, air/fuel ratio, and catalyst temperature. The specific polynomial equation is selected during ongoing operation based upon engine control comprising air/fuel ratio in one of the rich control mode and the stoichiometric control mode, engine control in one of the normal state and the cylinder deactivation state, and engine control in one of the warm-up mode and in the warmed-up mode. This is now described in detail.

The nominal engine power loss is evaluated using Eq. 1, below:

$$P_{LOSS\ ENG} = \dot{m}_{FUEL} \cdot \left(\frac{P_{ENG}}{\dot{m}_{FUEL}}\right)_{MAX} - P_{ENG} \qquad [1]$$

The first term on the right side of the equation represents the amount of engine power that is expected when the conversion of fuel energy occurs at maximum efficiency. The term $$\left(\frac{P_{ENG}}{\dot{m}_{FUEL}}\right)$$

is a constant term, derived for a specific engine design. The term $P_{ENG}$ represents the actual power produced by the engine. The difference between the two terms determines the nominal engine power loss. At the engine speed and load of peak efficiency, (i.e., lowest brake-specific fuel consumption) engine power loss is zero. Although this point has the lowest engine power loss the other component power losses must be considered to minimize overall power loss. As shown with reference to FIG. 2, the nominal engine power loss is lowest in the areas where either the efficiency is high or the fuel consumption is low. Peak engine efficiency typically occurs at an engine speed of about 2000 RPM and a wide-open throttle condition. Low fuel consumption occurs at low speed and low load.

Engine power loss normally refers to power loss related to fuel consumption but it can alternatively be expressed with regard to the amount of emissions generated, as illustrated in Eq. 2:

$$P_{LOSS\ ENG} = \dot{m}_{FUEL} \cdot \left(\frac{P_{ENG}}{\dot{m}_{EMIS}}\right)_{MAX} - P_{ENG} \qquad [2]$$

In this case the first term on the right side of the equation represents the engine power that is expected for the amount of emissions that are being generated if the ratio of power to emission rate were at the maximum (i.e., lowest brake-specific emissions). The term $$\left(\frac{P_{ENG}}{\dot{m}_{EMIS}}\right)$$

is again a constant term, derived for a given engine design. This equation can be written in terms of any emissions component, including, e.g., HC, CO, and, $NO_X$.

The nominal power loss is determined based upon the engine operating point, comprising the engine speed and torque. The nominal power loss is preferably determined during each 50 msec engine loop cycle, from a predetermined calibration table, determined for the exemplary engine operating over a range of engine speed and load conditions under nominal engine operating conditions for temperature, barometric pressure and stoichiometric air/fuel ratio (i.e., EQR=1.0). To accurately evaluate the engine power loss the fuel consumption must be estimated across all speeds and loads for various potential operating conditions. Changes in coolant temperature or barometric pressure can significantly affect these values. To account for changes in the nominal power loss because of engine control at non-standard conditions, the power loss correction, $\Delta P_{LOSS\_ENG}$, is added to the nominal power loss $P_{LOSS\_ENG}$.

The power loss correction, $\Delta P_{LOSS\_ENG}$ is calculated based upon the operating conditions including ambient temperature, and catalyst temperature, barometric pressure, and air/fuel ratio, and executing one of a plurality of embedded polynomial equations which calculates a power loss correction based upon the current actual operating conditions. The power loss correction is determined based upon the speed (Ni) and torque (Ti) originating from the engine, using the machine-executable equation of Eq. 3:

$$\Delta P_{LOSS\_ENG} = C0 + C1*Ti + C2*Ti^2 + C3*Ni + C4*Ni*Ti + C5*Ni*Ti^2 C6*Ni^2 + C7*Ni^2*Ti + C8*Ni^2*Ti^2. \qquad [3]$$

Figure 2:
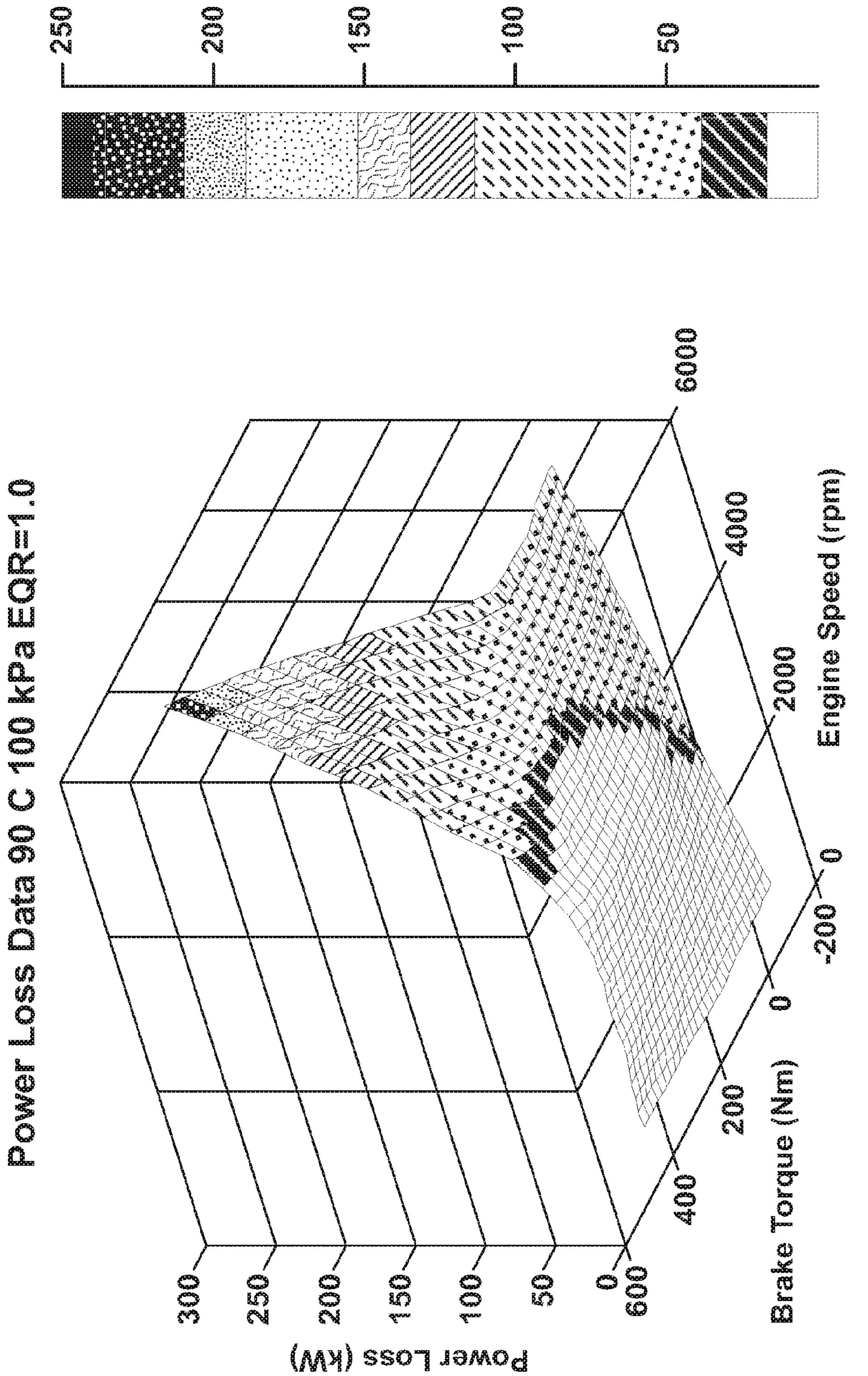
FIGS. 2, 3, and 4 are graphical depictions, in accordance with the present invention; and, FIG. 5 is a graphical depiction in tabular form, in accordance with the present invention.
Figure 3:
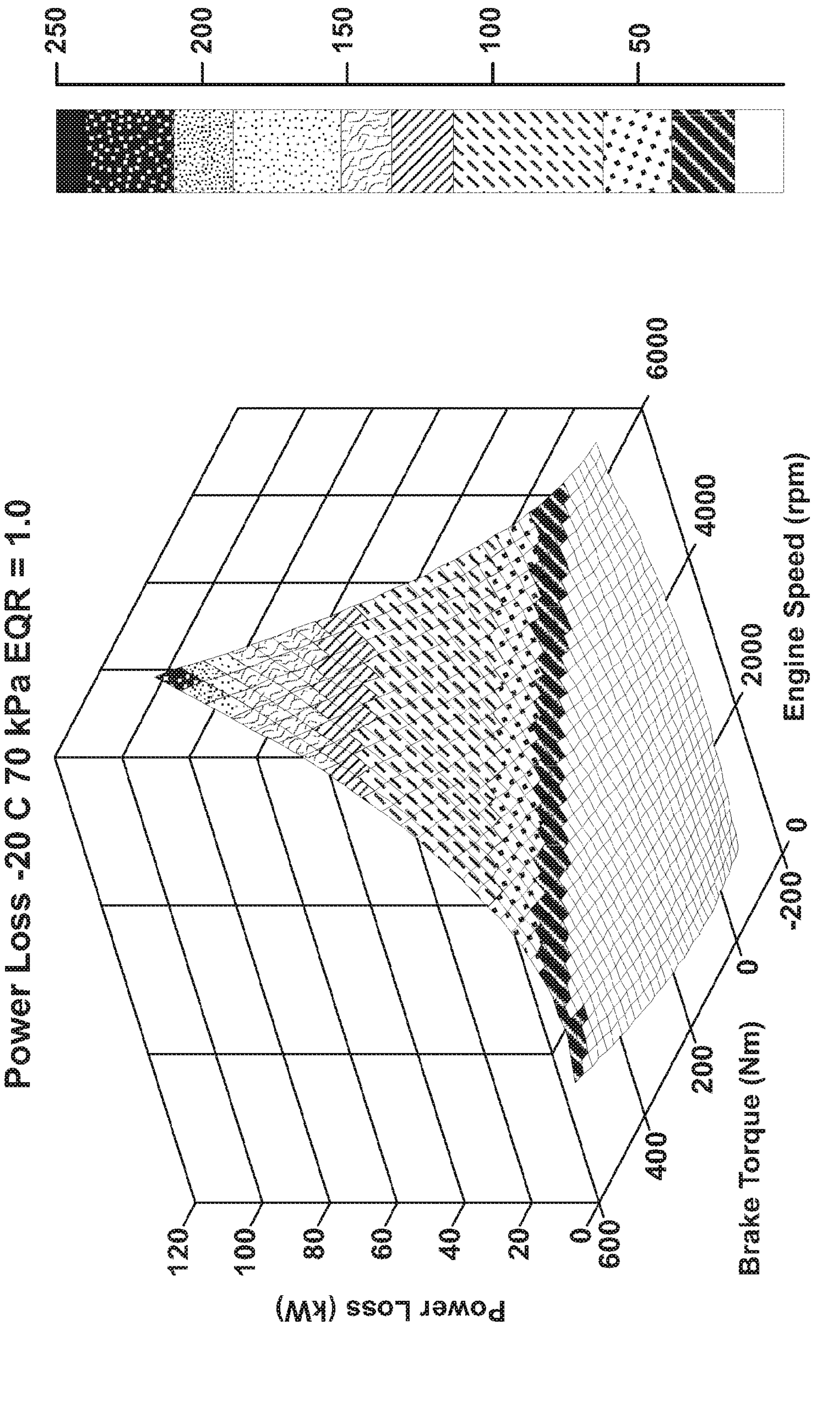
Figure 4:
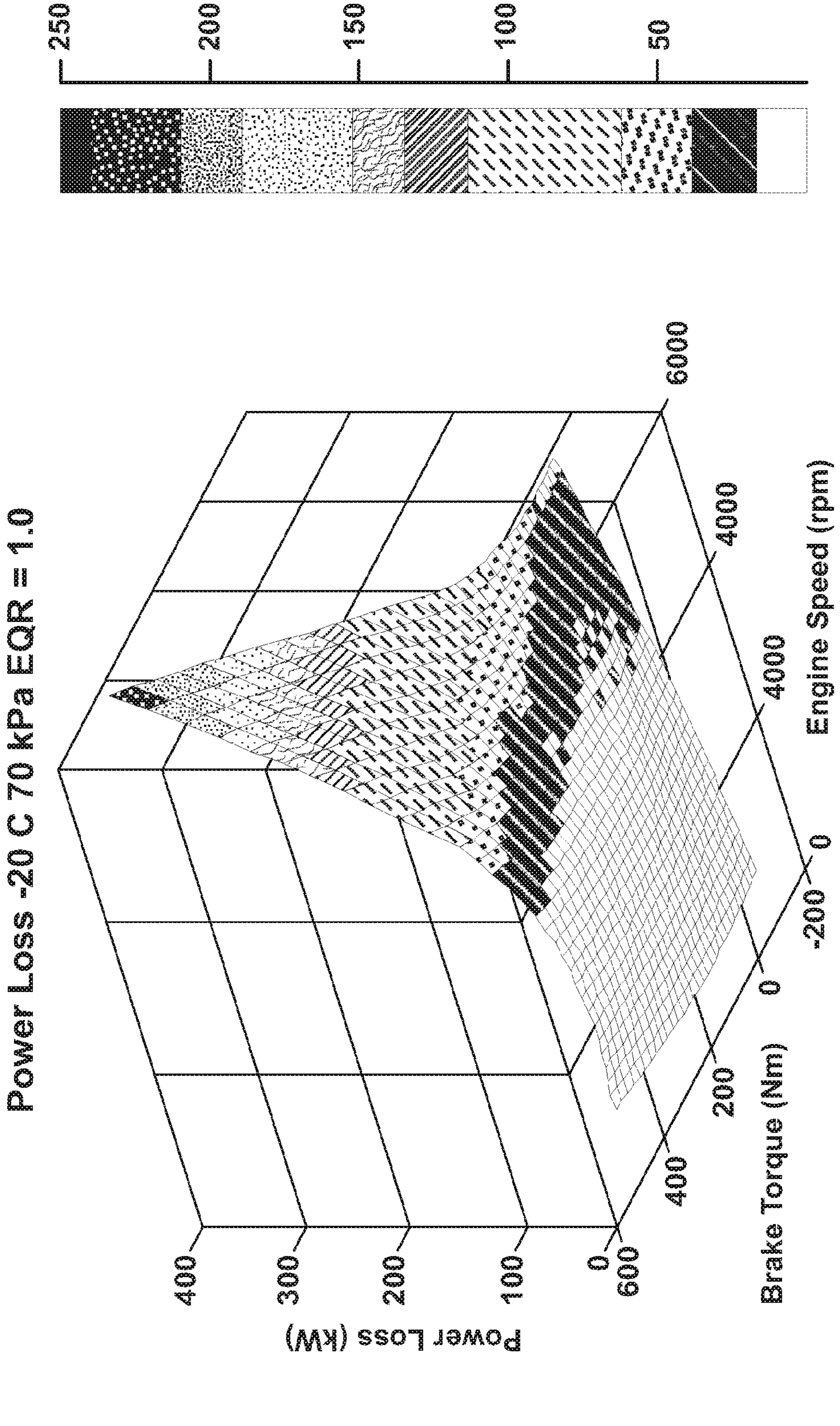

The coefficients C0-C8 are preferably calibrated and evaluated using a least squares curve fit derived using engine data generated over the ranges of engine input speeds and loads and the engine control comprising the operating modes and states. Coefficients C0-C8 are generated for the air/fuel ratio operating modes comprising the stoichiometric and the rich operating modes, and the engine temperature modes comprising the warm-up and the warmed up modes. Coefficients C0-C8 are further generated for the engine states of normal engine operation and cylinder deactivation. The coefficients can be stored in arrays within one of the memory devices for each of the operating modes and engine states, for retrieval during the ongoing engine operation. Referring now to FIG. 3, an illustrative power loss correction is depicted, determined for a specific operating condition of low ambient air temperature (−20 C.), and a low barometric pressure (70 kPa altitude) at an equivalence ratio of 1.0 (stoichiometric). FIG. 4 comprises a graphical depiction of a point-by-point summation of FIGS. 2 and 3, representing a total power loss for the specific conditions described with reference to FIG. 3.

As previously mentioned, there is a plurality of power loss correction polynomial equations, each executable within one of the control modules. In the exemplary embodiment, there are eight polynomial equations, derived for combinations of engine control comprising: air/fuel ratio control modes of rich and stoichiometric, i.e., an air/fuel equivalence ratio of about 0.7 (rich) and 1.0 (stoichiometry); normal and cylinder deactivation states; and, engine operating temperature comprising the warm-up mode and the warmed-up mode, i.e., coolant temperature at or about 90° C. In operation, the engine system monitors ongoing operation, including engine speed (RPM), load (brake torque or NMEP in N-m), barometric pressure, coolant temperature, and air/fuel ratio.

Each of the power loss correction equations comprises summing results from individually executed polynomial equations, depicted below. The individually executed polynomial equations comprise: power loss related to supplemental fuel necessary for engine control, as shown in Eq. 4; power loss related to HC emissions, as shown in Eq. 5; power loss related to $NO_X$ emissions, as shown in Eq. 6; power loss related to coolant and engine oil warm-up, as shown in Eq. 7; power loss related to catalyst warm-up to meet HC emissions, as shown in Eq. 8; power loss related to catalyst warm-up to meet $NO_X$ emissions, as shown in Eq. 9; power loss related to engine controls to prevent or mitigate catalyst over-temperature, as shown in Eq. 10; and, power loss related to engine controls to prevent or mitigate coolant over-temperature, as shown with reference to Eq. 11.

The power loss related to supplemental fuel necessary for stable engine control under the current operating conditions is preferably calculated using Eq. 4, as follows:

$$\beta_1(t, T_{CAT})\cdot\left[\dot{m}_{FUEL}\cdot\left(\frac{P_{ENG}}{m_{FUEL}}\right)_{MAX} - P_{ENG}\right] \qquad [4]$$

The power loss related to fueling to optimize HC emissions is preferably calculated using Eq. 5, as follows:

$$\beta_2(t, T_{CAT})\cdot\left[\dot{m}_{HC\,EMIS}\cdot\left(\frac{P_{ENG}}{\dot{m}_{HC\,EMIS}}\right)_{MAX} - P_{ENG}\right] \qquad [5]$$

The power loss related to fueling to optimize $NO_X$ emissions is preferably calculated using Eq. 6, as follows:

$$\beta_3(t, T_{CAT})\cdot\left[\dot{m}_{NOx\,EMIS}\cdot\left(\frac{P_{ENG}}{\dot{m}_{NOx\,EMIS}}\right)_{MAX} - P_{ENG}\right] \qquad [6]$$

The power loss related to fueling to effect coolant and engine oil warm-up is preferably calculated using Eq. 7, as follows:

$$\beta_4(t, T_{CAT})\cdot\frac{dE_{FUEL}(t, T_{COOL})}{dT_{COOL}}\cdot\frac{dT_{COOL}(Ni, Ti, T_{COOL})}{dt} \qquad [7]$$

The power loss related to fueling to effect catalyst warm-up to meet HC emissions is preferably calculated using Eq. 8, as follows:

$$\beta_5(t, T_{CAT})\cdot\frac{dE_{HC}(t, T_{CAT})}{dT_{CAT}}\cdot\frac{dT_{CAT}(Ni, Ti, T_{CAT})}{dt} \qquad [8]$$

The power loss related to fueling to effect catalyst warm-up to meet $NO_X$ emissions is preferably calculated using Eq. 9, as follows:

$$\beta_6(t, T_{CAT})\cdot\frac{dE_{NOx}(t, T_{CAT})}{dT_{CAT}}\cdot\frac{dT_{CAT}(Ni, Ti, T_{CAT})}{dt} \qquad [9]$$

The power loss related to fueling to prevent catalyst over-temperature is preferably calculated using Eq. 10, as follows:

$$\beta_7(t, T_{CAT})\cdot\frac{dT_{CAT}(Ni, Ti, T_{CAT})}{dt} \qquad [10]$$

The power loss related to fueling to prevent engine over-temperature is preferably calculated using Eq. 11, as follows:

$$\beta_8(t, T_{CAT}, T_{COOL})\cdot\frac{dT_{COOL}(Ni, Ti, T_{COOL})}{dt} \qquad [11]$$

The terms in Eqs. 4-11 are precalibrated and stored as arrays in memory, based upon the operating conditions and the engine control. $T_{CAT}$ comprises catalyst temperature, typically an estimated value. The term $T_{COOL}$ comprises coolant temperature, typically measured. The terms for $\dot{m}$ for fuel, HC emissions, and $NO_X$ emissions comprise mass fuel flow-rates related to fueling actions to supplemental fuel and to meet HC and $NO_X$ emissions. The terms $E_{FUEL}$, $E_{HC}$, and $E_{NOX}$ comprise energy losses related to the supplemental fuel and to meet HC and $NO_X$ emissions. The dT/dt terms are precalibrated terms which vary with the engine speed, torque, and temperature. The dE/dT terms are precalibrated terms which vary with elapsed time and temperature, and are based on off-line energy loss calculations. These values are stored in tables with axes of engine run time and catalyst temperature, or, alternatively in tables with axes of engine run time and coolant temperature.

The coefficients $\beta_1(t, T_{CAT})$-$\beta_8(t, T_{CAT})$ comprise weighting factors for each of the power loss equations, and are determined for a range of elapsed engine run times, t, since start of the engine, and estimated catalyst temperatures, $T_{CAT}$, (or alternatively, coolant temperatures, $T_{COOL}$). The coefficients are preferably calibrated and evaluated using a least squares curve fit using engine data. The coefficients are stored as calibration tables in array form within ROM for various operating conditions and are retrievable during the ongoing engine operation. A two-dimensional calibration table illustrative of the array is depicted with reference to FIG. 5. The calibration table (or array) comprises a plurality of cells arranged for a range of discrete catalyst temperatures ranging from 0° C. to 1000° C., and discrete engine run times, t, from 0 seconds to 150 seconds or more. As depicted, one of the cells contains coefficients $\beta_1(t, T_{CAT})$ through $\beta_8(t, T_{CAT})$, at t=0 seconds and $T_{CAT}$=0° C. It is understood that each of the cells in the array contains predetermined values for coefficients $\beta_1(t, T_{CAT})$ through $\beta_8(t, T_{CAT})$. Typically the coefficients are calibrated such that $\beta_1+\beta_2+\beta_3=1$, $\beta_4+\beta_5+\beta_6=1$, $\beta_1=\beta_4$, $\beta_2=\beta_5$, and $\beta_3=\beta_6$. The $\beta_7$ term is a subjective calibration used to penalize engine operation (speed and load) that increases the catalyst temperature when the catalyst temperature is high, i.e., of a temperature sufficient to cause damage to the catalyst if operation at or near that temperature is maintained. Controlling the catalyst temperature using this method reduces or eliminates a need for fuel enrichment conditions commonly used to reduce catalyst temperature. The $\beta_8$ term is a subjective calibration used to penalize engine operation (speed and load) that increases the coolant temperature when the coolant temperature is too high. Linear interpolation is used to determine the coefficients when the operating conditions are between table values.

Each of Eqs. 4-11 are executed in a form of Eq. 3, with specifically calibrated coefficients C0-C8, and inputs of engine speed and torque. This includes forms of Eqs. 4-11 generated for each air/fuel ratio control mode comprising one the stoichiometric operating mode and the rich operating mode, and each engine temperature mode comprising the warm-up mode and the warmed up mode. Coefficients C0-C8 are further generated for each of the engine states comprising normal engine operation ('ALL_CYL'), and engine operation with deactivated cylinders ('DEACT'). The polynomial coefficients C0-C8 are evaluated for each of the equations during ongoing operation and then combined into one equation at a relatively slow rate of once per second in one of the control modules. The β terms determine the weighting between the different types of engine power loss, as described hereinbelow. The final polynomial equation is evaluated hundreds of times every second as part of the optimization routines that typically run at a much faster rate.

The polynomial equation for power loss reflected in Eqs. 4-11 provides the correction to the standard power loss calculation. Equation derivations and coefficients are determined for the normal operating mode, i.e., all cylinders active, and for cylinder deactivation mode, i.e., half of the cylinders active. These equation derivations and coefficients are further derived for each of a standard and a low barometric pressure, e.g., 100 kPa and 70 kPa. These equation derivations and coefficients are further derived for each of stoichiometric mode and rich mode, e.g., controlling the air/fuel equivalence ratio to one of 1.0 and 0.7. Determining a power loss at a specific engine operating control condition can comprise determining power loss using the standard equations and interpolating therebetween to determine power loss at the real-time operating conditions.

This approach allows engine power loss, including complex engine power loss characteristics, to be calculated using a single table lookup and a polynomial equation i.e., Eq. 3, wherein coefficients C0-C8 are determined based upon the current engine control and the operating conditions. The polynomial equation, comprising summing the nominal power loss and results from Eqs. 4 through 11 represents total engine power loss for rapid execution. The final coefficients to the polynomial equation of Eq. 3 are based on precalibrated factors and weighting factors, as described above. This determination of the coefficients can be performed at a relatively slow update rate, e.g., once per second. The polynomial equation is used in the optimization routine numerous times before the next update. Since detailed models of the engine fuel consumption and emissions are used in the control software, fuel economy and total emissions can be predicted with simple simulation routines. This allows the effects of calibration changes to be quantified before running emission tests, which can improve system calibration efficacy.

The system requires preproduction system calibration. Typically this comprises operating a representative engine and vehicle under known, repeatable vehicle operating conditions at normal engine operating conditions to obtain a baseline. The engine can then be tested with all cylinders operating and in the deactivation mode, and at stoichiometric operating mode and a rich operating mode, and with a warmed up catalyst and in a catalyst warm-up mode. An engine torque and airflow model is preferably used to evaluate fuel consumption for non-standard conditions, e.g., low coolant temperature and/or barometric pressure. The engine can be tested at various coolant temperatures and barometric pressures to verify fuel consumption correction and to measure emissions. Engine heat rejection data and a thermal model of the engine can be used to predict coolant warm-up rate, and verified with vehicle testing. Similarly, a known mathematical model can be used to generate calibration tables. A catalyst cold start thermal model can be used to predict warm-up rate and verified.

The engine control scheme uses the estimated power loss to control operation and performance of the engine to meet specific criteria. This includes controlling power loss to optimize warm-up of the engine and the exhaust aftertreatment system, controlling power loss to minimize engine fuel consumption, and controlling power loss to meet specific emissions targets.

The invention has been described with specific reference to the embodiments and modifications thereto. Further modifications and alterations may occur to others upon reading and understanding the specification. It is intended to include all such modifications and alterations insofar as they come within the scope of the invention.

Having thus described the invention, it is claimed:

1. Article of manufacture, comprising a storage medium having a machine-executable program encoded therein to control operation of an internal combustion engine, the program comprising:

code to monitor engine operating conditions;

code to determine a nominal power loss based upon an engine operating point;

code to determine a power loss correction to the nominal power loss based upon the engine operating conditions and the engine operating point, the power loss correction determinable for combinations of an engine air/fuel ratio mode, an engine cylinder activation state, and, an engine operating temperature mode; and, code to estimate a power loss for the internal combustion engine based upon the nominal power loss and the power loss correction.

2. The article of claim 1, wherein the power loss correction determinable for combinations of the engine air/fuel ratio mode further comprises one of a stoichiometric and a rich operation.

3. The article of claim 1, wherein the power loss correction determinable for combinations of the engine cylinder activation state further comprises one of a normal state and a deactivation state.

4. The article of claim 1, wherein the power loss correction determinable for combinations of the engine operating temperature mode further comprises one of a warm-up and a warmed-up mode.

5. The article of claim 1, wherein the monitored engine operating conditions comprise barometric pressure, engine temperature, air/fuel ratio, and catalyst temperature.

6. The article of claim 1, wherein the engine operating point comprises engine speed and torque output.

7. The article of claim 6, wherein the code to determine the nominal power loss based upon the engine operating point comprises a precalibrated array retrievable based upon the engine speed and torque output.

8. The article of claim 1, wherein the code to determine the power loss correction further comprises code comprising a single executable polynomial equation operative to calculate the power loss correction based upon engine speed and torque output and a plurality of coefficients.

9. The article of claim 8, wherein the plurality of coefficients are determined for combinations of an engine air/fuel ratio mode, an engine cylinder activation state, and, an engine operating temperature mode.

10. The article of claim 8, wherein the coefficients for the polynomial equation are determined based upon: supplemental fueling to operate the engine.

11. The article of claim 8, wherein the coefficients for the polynomial equation are determined based upon fueling to optimize hydrocarbon and $NO_x$ emissions.

12. The article of claim 8, wherein the coefficients for the polynomial equation are determined based upon: supplemental fueling to effect coolant and engine oil warm-up.

13. The article of claim 8, wherein the coefficients for the polynomial equation are determined based upon fueling to effect catalyst warm-up to meet HC emissions and $NO_x$ emissions targets.

14. The article of claim 8, wherein the coefficients for the polynomial equation are determined based upon fueling to prevent catalyst over-temperature operation.

15. Article of manufacture, comprising a storage medium having machine-executable program stored therein to estimate a correction from a nominal power loss for an internal combustion engine to control engine operation, the program comprising:

code to monitor engine operating conditions;

code to monitor engine operation, comprising: engine operating modes of an engine air/fuel ratio mode and an engine operating temperature mode, and an engine cylinder activation state;

code to determine a power loss correction at an engine operating point based upon the engine operating conditions and the engine operation; and, code to control engine operation based upon the nominal power loss and the power loss correction.

16. The article of claim 15, wherein the engine operating conditions comprise at least one of barometric pressure, engine temperature, air/fuel ratio, and catalyst temperature.

17. The article of claim 15, wherein the nominal power loss is determined based upon the operating point, and, comprises a predetermined calibration array retrievable based upon engine speed and torque output.

18. The article of claim 15, wherein the code to determine the power loss correction at the engine operating point further comprises code comprising a single executable polynomial equation operative to calculate the power loss correction based upon engine speed and torque output and a plurality of coefficients.

19. Method for operating an engine, comprising:

estimating an instantaneous power loss for an internal combustion engine, comprising: monitoring engine operating conditions; determining a nominal power loss at an engine operating point based upon the engine operating conditions; determining a power loss correction to the nominal power loss based upon the engine operating conditions and the engine operating point, the power loss correction determinable for combinations of an engine air/fuel ratio mode, an engine cylinder activation state, and, an engine operating temperature mode; and, controlling the engine based upon the estimated instantaneous power loss.

20. The method of claim 19, wherein the combinations for the power loss correction comprise: the engine air/fuel ratio mode comprising one of a stoichiometric and a rich operation; the engine cylinder activation state comprising one of a normal state and a deactivation state; and, the engine operating temperature mode comprising one of a warm-up and a warmed-up mode.

* * * * *